United States Patent [19]

Hirakouchi et al.

[11] Patent Number: 5,411,810
[45] Date of Patent: May 2, 1995

[54] VISCOELASTIC RESIN COMPOSITION FOR A VIBRATION DAMPING MATERIAL

[75] Inventors: Hiroshi Hirakouchi, Tokyo; Masanori Nakamura; Takeshi Yatsuka, both of Ohtsu; Nobuo Kadowaki, Futtsu, all of Japan

[73] Assignee: Toyo Boseki Kabushiki Kaisha, Tokyo, Japan

[21] Appl. No.: 84,296

[22] Filed: Jun. 28, 1993

[30] Foreign Application Priority Data

Jun. 30, 1992 [JP] Japan ................... 4-197681

[51] Int. Cl.⁶ .................. B32B 15/06; B32B 27/06; B32B 27/36; C08F 22/10
[52] U.S. Cl. .................. 428/480; 428/458; 525/438; 525/444
[58] Field of Search .................. 428/480, 457, 458; 525/437, 444, 438

[56] References Cited

U.S. PATENT DOCUMENTS

| | | | |
|---|---|---|---|
| 4,447,493 | 5/1984 | Driscoll et al. | 428/332 |
| 4,859,523 | 8/1989 | Entoh et al. | 428/215 |
| 4,942,219 | 7/1990 | Yatsuka et al. | 528/272 |
| 5,183,863 | 2/1993 | Nakamura et al. | 525/438 |

FOREIGN PATENT DOCUMENTS

| | | |
|---|---|---|
| 39-12451 | 7/1964 | Japan . |
| 45-34703 | 11/1970 | Japan . |
| 50-143880 | 11/1975 | Japan . |
| 51-41080 | 5/1976 | Japan . |
| 51-83640 | 7/1976 | Japan . |
| 51-91981 | 8/1976 | Japan . |
| 51-93770 | 8/1976 | Japan . |
| 52-26554 | 7/1977 | Japan . |
| 55-27975 | 7/1980 | Japan . |
| 56-159160 | 12/1981 | Japan . |
| 57-34949 | 2/1982 | Japan . |
| 60-258262 | 12/1985 | Japan . |
| 62-295949 | 12/1987 | Japan . |
| 63-202446 | 8/1988 | Japan . |

Primary Examiner—Paul J. Thibodeau
Assistant Examiner—Vivian Chen
Attorney, Agent, or Firm—Leydig, Voit & Mayer, Ltd.

[57] ABSTRACT

The present invention relates to a viscoelastic resin composition for a vibration damping material and a vibration damping material using the same. The viscoelastic resin composition includes as its main components: Low Tg resin (A) with a glass transition temperature of −60° C. to 0° C. and a number average molecular weight of 5000 to 50000, the Low Tg resin (A) being a polyester containing an acid component having 50 to 90 mol % of aromatic dicarboxylic acid and 10 to 50 mol % of dimer acid, and a glycol component having at least 30 mol % of glycol with an alkyl group as its side chain and the glycol having at least four carbon atoms; and High Tg resin (B) which is at least one selected from the group consisting of amorphous polyester resins, phenoxy resins, and epoxy resins, the epoxy resins having a number average molecular weight of at least 1000, the respective resins having a glass transition temperature in the range of 0° C. to 80° C.; wherein the weight ratio between the Low Tg resin (A) and the High Tg resin (B) is in the range of 90:10 to 30:70. This viscoelastic resin composition is used for a resin layer of an attachable vibration damping material and a sandwich type vibration damping material.

5 Claims, No Drawings

VISCOELASTIC RESIN COMPOSITION FOR A VIBRATION DAMPING MATERIAL

BACKGROUND OF THE INVENTION

1. Field of the Invention

The present invention relates to a viscoelastic resin composition for a vibration damping material and a vibration damping material using the same. More specifically, the present invention relates to a viscoelastic resin composition capable of sufficiently absorbing a vibration energy and effectively converting the vibration energy into a heat energy, and an attachable vibration damping material which shows a vibration damping property by being attached to a vibrating portion, or a sandwich-type vibration damping material.

2. Description of the Related Art

In recent years, with the development of a transportation system and the access of a residence to factories, environmental pollution such as noises and vibration has caused social problems. Thus, there is a tendency that noises and vibration are regulated for the purpose of improving the environment of a residence near a work place. Under this circumstance, there has been a demand for providing a metallic material (i.e., a source of noises and vibration) with a vibration damping property end improving the property. Here, the vibration damping property means a function of absorbing a vibration energy of a member itself which generates noises, converting the vibration energy into a heat energy, attenuating a vibration speed or a vibration amplitude, and thereby minimizing sound reflection. Electronic parts such as those used in a computer have advanced in high performance, precision, and miniaturization. Thus, it is necessary to reduce the transmission of vibration from outside or inside the computer so as to allow these electronic parts to precisely operate.

In order to satisfy the above-mentioned demands, a vibration damping material having a composite structure in which a film of a viscoelastic resin is sandwiched between two substrates made of a steel plate, a stainless steel foil, or the like (hereinafter, referred to as a sandwich-type vibration damping material) has been proposed as material showing a vibration damping property. The sandwich-type vibration damping material has been studied and applied to oil pans of automobiles, engine covers, chutes of hoppers, stoppers of conveying apparatuses, domestic electric equipment, vibration reducing members of metal processing machines, structural members of precision machines in which the prevention of vibration is desired, and the like.

In general, the vibration damping property of the above-mentioned sandwich-type vibration damping material depends on the performance of a viscoelastic resin used in the same. This vibration damping property can be expressed in terms of a loss factor which represents a degree of conversion of an external vibration energy into a heat energy by internal friction and which corresponds to an amount showing a dynamic hysteresis loss due to vibration. When the dynamic hysteresis loss factor is measured at various temperatures and a graph showing the variation of the factor is drawn, the graph shows a peak at a certain temperature. It is known that the vibration damping material is most effectively used in the vicinity of the temperature at which the factor shows a peak.

Hitherto, the following examples of a resin layer of the sandwich-type vibration damping material have been known: a simple polyester resin (Japanese Laid-Open Patent Publication No. 50-143880); a resin composition obtained by adding a plasticizer to a polyester (Japanese Laid-Open Patent Publication No. 51-93770); a resin composition obtained by mixing an organic peroxide with a polyester (Japanese Laid-Open Patent Publication Nos. 51-41080 and 51-83640); a resin composition which is a combination of a plurality of polyesters (Japanese Laid-Open Patent Publication Nos. 62-295949 and 63-202446); a simple polyurethane foam (Japanese Laid-Open Patent Publication No. 51-91981), a simple polyamide resin (Japanese Laid-Open Patent Publication No. 56-159160); a simple ethylene-polyvinyl acetate copolymer (Japanese Laid-Open Patent Publication No. 57-34949); a resin composition obtained by adding a plasticizer and a tackifier to a polyvinyl butyral or to a combination of a polyvinyl butyral and a polyvinyl acetate (Japanese Patent Publication No. 55-27975); a copolymer of a isocyanate prepolymer and a vinyl monomer (Japanese Patent Publication No. 52-26554); copolymers disclosed in Japanese Laid-Open Patent Publication No. 60-258262, Japanese Patent Publication Nos. 39-12451 and 45-34703, and U.S. Pat. No. 4,447,493; and the like.

Another example of the vibration damping material includes an attachable vibration damping material in which a viscoelastic resin layer is formed on the surface of a base layer having high rigidity. The attachable vibration damping material exhibits a vibration damping property by being directly attached to a vibrating portion or a vibration transmitting portion. This material is used for the purpose of reducing noises end vibration of office apparatuses, domestic electric equipment, terminal apparatuses of computers, etc. This type of material is light-weight and easily used.

In general, the sandwich-type and attachable vibration damping materials are required to have a high loss factor in a wide range of temperatures. However, a conventional resin composition used for a viscoelastic resin layer does not fully satisfy this requirement. Moreover, in the sandwich-type and attachable vibration damping materials, high adhesion between the resin layer and the base layer or the vibration portion, and satisfactory durability under various circumstances are required. The conventional resin composition does not satisfy these requirements. The attachable vibration damping material is directly attached to a vibrating portion by adhering the resin layer thereof to the vibrating portion. Thus, in the case where a viscoelastic resin composition, which has been conventionally used for the attachable vibration damping material, is used for the resin layer, there are a number of problems involving heat-resistance and durability. At a high temperature, the resin composition is likely to be decomposed. As a result, serious problems are caused when the resin composition is used for an external memory device of a computer.

SUMMARY OF THE INVENTION

The viscoelastic resin composition for a vibration damping material of the present invention, includes as its main components:

Low Tg resin (A) with a glass transition temperature of $-60°$ C. to $0°$ C. and a number average molecular weight of 5000 to 50000, the Low Tg resin (A) being a polyester containing an acid component having 50 to 90 mol % of aromatic dicarboxylic acid and 10 to 50 mol % of dimer acid, and a glycol component having at least 30 mol % of glycol with an alkyl group as its side chain and the glycol having at least four carbon atoms; and High Tg resin (B) which is at least one selected from the group consisting of amorphous polyester resins, phenoxy resins, and epoxy resins, the epoxy resins having a number average molecular weight of at least 1000, the respective resins having a glass transition temperature in the range of 0° C. to 80° C., wherein the weight ratio between the Low Tg resin (A) and the High Tg resin (B) is in the range of 90:10 to 30:70.

In one embodiment of the present invention, the difference in specific gravity at 30° C. between the Low Tg resin (A) and the High Tg resin (B) is in the range of 0.07 to 0.25.

In another embodiment of the present invention, the difference in specific gravity at 30° C. between the Low Tg resin (A) and the High Tg resin (B) is in the range of 0.1 to 0.2.

In another embodiment of the present invention, the above-mentioned viscoelastic resin composition for a vibration damping material further includes at least one hardener selected from the group consisting of epoxy resins, polyisocyanate compounds, acid anhydride compounds, and acrylate monomers.

In another embodiment of the present invention, the above-mentioned viscoelastic resin composition for a vibration damping material further includes at least one tackifier selected from the group consisting of modified rosins, coumarone-indene resins, and xylene resins.

In another aspect of the present invention, an attachable vibration damping material is provided, which has a substrate and a layer made of the above-mentioned viscoelastic resin composition formed on the substrate with a Young's modulus of $3 \times 10^{10}$ dyne/cm² at 20° C.

Thus, the invention described herein makes possible the advantages of (1) providing a viscoelastic resin composition excellent in adhesion, which is suitable for the use as a resin layer of a sandwich-type or attachable vibration damping material excellent in a vibration damping property, durability, and heat resistance in a wide range from an ordinary temperature to a high temperature; and (2) providing a vibration damping material using the above-mentioned viscoelastic resin composition, the material having an excellent vibration damping property.

These and other advantages of the present invention will become apparent to those skilled in the art upon reading and understanding the following detailed description.

DESCRIPTION OF THE PREFERRED EMBODIMENTS

First of all, Polyester resin (A) with a glass transition temperature (Tg) of $-60°$ to 0° C. (hereinafter, referred to as Low Tg resin (A)) will be described.

As acid components of Low Tg resin (A), an aromatic dicarboxylic acid and a dimer acid are used.

Examples of the aromatic dicarboxylic acid include terephthalic acid, isophthalic acid, orthophthalic acid, 2,6-naphthalenedicarboxylic acid, diphenyldicarboxylic acid, diphenylmethane dicarboxylic acid, phenylindene dicarboxylic acid, and the like. Among them, terephthalic acid and isophthalic acid are preferred. The dimer acid can be hydrogenated.

For the purpose of improving the reactivity of Low Tg resin (A) to be obtained with respect to a hardener (when it is contained) and keeping the balance between cohesion and adhesion of the viscoelastic resin composition containing Low Tg resin (A), it is preferred to use polyvalent carboxylic acid with at least three functional groups as the acid component. Examples of the polyvalent carboxylic acid include trimellitic acid anhydride, pyromellitic acid anhydride, and the like. In particular, trimellitic acid anhydride is preferred. The polyvalent carboxylic acid with at least three functional groups are preferably contained in the acid component of Low Tg resin (A) in an amount in the range of 0.5 to 5 mol %.

Low Tg resin (A) used in the present invention can further contain, as its acid component, an aliphatic dicarboxylic acid such as succinic acid, adipic acid, azelaic acid, and sebacic acid; and/or an alicyclic dicarboxylic acid such as 1,4-cyclohexane dicarboxylic acid, 1,3-cyclohexane dicarboxylic acid, and 4-methyl-1,2-cyclohexane dicarboxylic acid. In this case, the content of the aliphatic dicarboxylic acid and/or the alicyclic dicarboxylic acid is determined under the condition that the performance of Low Tg resin (A) to be obtained is not deteriorated and the contents of the aromatic dicarboxylic acid and the dimer acid satisfy the above-mentioned range.

Low Tg resin (A) contains, as a glycol component, a glycol having an alkyl group at its side chain and having at least four carbon atoms in an amount of 30 mol % or more based on the total amount of the glycol component. Examples of the glycol include neopentyl glycol, 2-butyl-2-ethyl-1,3-propanediol, 2,2-diethyl-1,3-propanediol, 2-ethyl-2-methyl-1,3-propanediol, 3-methylpentanediol, neopentyl glycol hydroxypivalate, 2,2-dimethylolpentane, trimethylpentanediol, 8,13-dimethyleicosanediol, reduced dimer acid (i.e., dimer glycol), 2,2-bis(4-hydroxymethoxyphenyl)propane, 2,2-bis(4-hydroxyethoxyphenyl)propane, 1,3-butanediol, and the like. Among these glycols, neopentyl glycol, 3-methylpentanediol, 2-butyl-2-ethyl-1,3-propanediol, 2,2-diethyl-1,3-propanediol, and neopentyl glycol hydroxypivalate are preferred.

Low Tg resin (A) used in the present invention contains the aromatic dicarboxylic acid in an amount in the range of 50 to 90 mol %, more preferably in an amount in the range of 60 to 85 mol % based on the total amount of the acid component. When the content of the aromatic dicarboxylic acid is less than 50 mol %, there is a tendency that the cohesion of Low Tg resin (A) to be obtained decreases, and the hydrolysis resistance of Low Tg resin (A) decreases. Also, the adhesion of a viscoelastic resin composition containing Low Tg resin (A) deteriorates. When the content of the aromatic dicarboxylic acid is more than 90 mol %, the adhesion and tackiness of a viscoelastic resin composition containing Low Tg resin (A) decrease and the vibration damping property of a vibration damping material obtained by using the resin composition decreases. Low Tg resin (A) contains dimer acid in an amount in the range of 10 to 50 mol %, more particularly in an amount in the range of 20 to 40 mol % based on the total amount of the acid component. When the content of the dimer acid is less than 10 mol %, the tackiness of a viscoelastic resin composition to be obtained and the vibration damping property of a material obtained by using the resin composition are insufficient. When the content of the dimer acid is more than 50 mol %, the cohesion of Low Tg resin (A) to be obtained decreases, resulting in the decrease in the adhesion of a viscoelastic resin composition to be obtained and the durability of a vibration damping material obtained by using the resin composition.

The above-mentioned glycol is contained in the glycol component of Low Tg resin (A) used in the present invention in an amount of 30 mol % or more, and more preferably, in an amount of 50 mol % or more. When the content of the above-mentioned glycol is less than 30 mol % of the total glycol component, the adhesion of a viscoelastic resin composition to be obtained and the vibration damping property of a vibration damping material obtained by using the resin composition become insufficient.

In addition to the above-mentioned glycols, if desired, a glycol having no alkyl group as its side chain can be contained in the glycol component of Low Tg resin (A) up to 70 mol %. Examples of the glycol having no side chain include ethylene glycol, 1,3-propanediol, 1,5-pentanediol, 1,4-butanediol, 1,6-hexanediol, 2,2-bis(4-hydroxyethoxyphenyl)methane, diethylene glycol, tricyclodecanedimethanol, 1,4-cyclohexanedimethanol, 1,9-nonanediol, eicosanediol, and the like. Among these glycols, ethylene glycol is preferred. Moreover, a polyol with at least three functional groups, such as glycerin, trimethylolpropane, and pentaerythritol can be used as long as the performance of Low Tg resin (A) to be obtained is not deteriorated.

There are a number of combinations of the acid component and the glycol component which can be used for preparing a polyester resin (i.e., Low Tg resin (A)). The combination is determined depending upon the required degree of cohesion of a resin to be obtained, the vibration damping property of a vibration damping material using the resin, etc. The respective component (i.e., the acid component and the glycol component) can be employed alone or in combination.

The polyester used in the present invention, i.e., Low Tg resin (A) can readily be obtained by the general transesterification method, the direct polymerization method, etc.

The glass transition temperature of Low Tg resin (A) used in the present invention is in the range of $-60°$ C. to $0°$ C., more preferably in the range of $-40°$ C. to $-10°$ C. When the glass transition temperature of Low Tg resin (A) is less than $-60°$ C., the cohesion thereof is low, and the adhesion of a viscoelastic resin composition to be obtained becomes insufficient. As described later, even if Low Tg resin (A) is cured by the addition of a hardener, the cohesion and the adhesion of the viscoelastic resin composition to be obtained are still insufficient. A vibration damping material obtained by using this resin composition has a poor vibration damping property at a temperature equal to or more than room temperature.

The number average molecular weight of Low Tg resin (A) used in the present invention is in the range of 5000 to 50000, more preferably in the range of 8000 to 30000. When the molecular weight is less than 5000, the cohesion of Low Tg resin (A) is weak, and the adhesion of a viscoelastic resin composition to be obtained becomes insufficient. As described later, even if Low Tg resin (A) is cured by the addition of a hardener, the cohesion thereof is still weak; thus, the adhesion of a viscoelastic resin composition to be obtained is still insufficient. It is difficult to obtain a resin with a number average molecular weight exceeding 50000 by a general polymerization method.

Considering the glass transition temperature of a resin to be obtained, the adhesion thereof and the reactivity thereof with a hardener (if added), it would be recommended that Low Tg resin (A) used in the present invention is reacted with lactones by ring-opening reaction at the terminal of its molecular chain. Examples of the lactones include $\beta$-propiolactone, $\beta$-2,2-dimethylpropiolactone, $\delta$-valerolactone, $\delta$-3-methylvalerolactone, $\epsilon$-caprolactone, and the like. $\epsilon$-caprolactone is particularly preferred. Two or more kinds of the copolymerized polyester resin as described above can be used in combination.

Next, a resin having a glass transition temperature (Tg) of $0°$ to $80°$ C. used in the present invention (hereinafter, referred to as High Tg resin (B)) will be described.

As High Tg resin (B), at least one resin selected from the group consisting of an amorphous polyester resin, a phenoxy resin, and an epoxy resin with a number average molecular weight of 1000 or more can be used.

The Tg of the polyester resin is preferably $10°$ C. to $60°$ C. The polyester resin should be amorphous, and if the polyester resin is crystalline, the vibration damping property of a material obtained by using the resin is decreased.

Examples of an acid component contained in the above-mentioned polyester resin include terephthalic acid, isophthalic acid, phthalic acid, 2,6-naphthalenedicalboxylic acid, diphenyldicarboxylic acid, phenylindene dicarboxylic acid, adipic acid, sebacic acid, azelaic acid, dodecanedioic acid, cyclohexanedicarboxylic acid, dimer acids, and the like. Polyvalent carboxylic acid such as trimellitic acid anhydride and piromellitic acid anhydride can be used as long as the performance of the polyester resin to be obtained is not deteriorated. Among these acid components, terephthalic acid, isophthalic acid, adipic acid, sebacic acid, and trimellitic acid anhydride are preferred. Examples of a glycol component contained in the above-mentioned polyester resin include neopentyl glycol, 2-butyl-2-ethyl-1,3-propanediol, 2,2-diethyl-1,3-propanediol, 2-ethyl-2-methyl-1,3-propanediol, 3-methylpentanediol, neopentyl glycol hydroxypivalate, 2,2-dimethylolpentanediol, trimethylpentanediol, 8,13-dimethyleicosanediol, reduced dimer acid, 2,2-bis(4-hydroxymethoxyphenyl)propane, 2,2-bis(4-hydroxyethoxyphenyl)propane, 1,3-butanediol, ethylene glycol, 1,3-propanediol, 1,5-pentanediol, 1,4-butanediol, 1,6-hexanediol, 2,2-bis(4-hydroxyethoxyphenyl)methane, diethylene glycol, tricyclodecanedimethanol, 1,4-cyclohexanedimethanol, 1,9-nonanediol, eicosanediol, and the like. A polyol with at least three functional groups, such as glycerin, trimethylolpropane, and pentaerythritol can be used as long as the performance of the polyester resin is not deteriorated. Among these glycols, it is preferred to use neopentyl glycol, ethylene glycol, 1,6-hexanediol, 1,4-butanediol, 2,2-bis(4-hydroxymethoxyphenyl)propane as the glycol component.

There are a number of combinations of the acid component and the glycol component which can be used for preparing a polyester resin (i.e., High Tg resin (B)). The combination is determined depending upon the required degree of cohesion of a resin to be obtained, the vibration damping property of a vibration damping material using the resin, etc. The respective component (i.e., the acid component and the glycol component) can be employed alone or in combination.

High Tg resin (B) can be obtained by using the above-mentioned acid component and the glycol component, and setting various preparative conditions for obtaining an amorphous polyester with a Tg of 0° C. to 80° C.

As the above-mentioned phenoxy resin, various kinds of ordinary phenoxy resins with a Tg of 0° C. to 80° C. can be used.

As the epoxy resin, any of the following types can be used: epi-bis type epoxy resins, alicyclic epoxy resins, glycidyl ester type resins, novolac type epoxy resins, and the like. The epoxy resin used in the present invention has a Tg of 0° C. to 80° C. and a number average molecular weight of 1000 or more. In the case where the molecular weight is less than 1000, the vibration damping property at a temperature of 50° C. to 120° of a vibration damping material to be obtained becomes unsatisfactory. It is not required that one kind of resin is used for High Tg resin (B), and two or more kinds of resins can be used in combination.

In the case where the compatibility between Low Tg resin (A) and High Tg resin (B) is satisfactory, it is sometimes difficult to obtain a vibration damping property in a wide range from an ordinary temperature to a high temperature and adhesion at an ordinary temperature. The specific gravity ratio between Low Tg resin (A) and High Tg resin (B) is preferably in the range of 0.07 to 0.25, more preferably in the range of 0.1 to 0.2. In these ranges, when Low Tg resin (A) and High Tg resin (B) are mixed, a microlayer separation structure can be formed; as a result, slight turbidness can be observed in the mixture at an ordinary temperature.

Low Tg resin (A) and High Tg resin (B) are contained in the composition of the present invention so that the weight ratio therebetween is 90:10 to 30:70. The ratio of 70:30 to 40:60 is more preferred. When the proportion of Low Tg resin (A) is more than 90% by weight, the vibration damping property at a high temperature of 50° C. or more of a vibration damping material prepared by using a viscoelastic resin composition to be obtained decreases. When the proportion of Low Tg resin (A) is less than 30% by weight, the adhesion and the tackiness of a resin composition to be obtained and the vibration damping property at an ordinary temperature of a vibration material prepared by using the resin composition decrease.

The viscoelastic resin composition of the present invention containing Low Tg resin (A) and High Tg resin (B) has sufficient adhesion, tackiness, and the vibration damping material prepared by using the resin composition has sufficient heat resistance. In order to further improve the heat resistance of the vibration damping material, at least one hardener capable of reacting with the polyester resin can be contained in the viscoelastic resin composition. Examples of the hardener include epoxy resins, polyisocyanate compounds, acid anhydride compounds, and the like.

When the above-mentioned hardener capable of reacting with the polyester resin is mixed in the viscoelastic resin composition, a cross-linking structure is formed. As a result, the hydrolysis resistance of the polyester resin, the adhesion of an attachable vibration damping material (formed by using the resin composition in which the hardener is mixed) with respect to an adherend, and heat resistance thereof improve. In addition, even when the vibration damping material is heated to a high temperature, the material is not peeled off from the adherend. As the epoxy resin, an epoxy resin with at least two glycidyl groups in one molecule is preferred. Examples of the epoxy resin include epi-bis type epoxy resins, alicyclic epoxy resins, glycidyl ester type resins, novolac type epoxy resins, and the like. Examples of the polyisocyanate compound include aliphatic, alicyclic, or aromatic polyisocyanate compounds with at least two functional groups. Considering the adhesion of a vibration damping material to be obtained with respect to an adherend and the heat resistance thereof, polyisocyanate compounds with at least three functional groups are preferred. Examples of the acid anhydride compounds include aliphatic acid anhydrides, alicyclic acid anhydrides, and aromatic acid anhydrides. Acid anhydrides having at least one, more preferably at least two acid anhydride groups in one molecule are preferred. As the hardener capable of reacting the above-mentioned polyester resins, there are a polyisocyanate compound; a combination of the polyisocyanate compound and the epoxy resin compound; a combination of the epoxy resin compound and the acid anhydride compound; and a combination of the epoxy resin compound, acid anhydride compound, and polyisocyanate compound.

It is also possible to add an acrylate monomer as a hardener for the purpose of improving the adhesion of a resin composition to be obtained and the heat resistance of a vibration damping material obtained by using the resin composition. The acrylate monomer partially reacts a double bond derived from dimer acid in a low Tg resin, thereby improving the adhesion of a resin composition to be obtained and the heat resistance of a vibration material obtained by using the resin composition. In this case, the acrylate monomer does not react with the polyester resin at a hydroxy group or a carboxy group of the polyester resin. Examples of the acrylate monomer include monofunctional acrylates, polyfunctional acrylates, monofunctional methacrylates, and polyfunctional methacrylates. Acrylates with a hydroxyl group, a carboxyl group, an epoxy group, etc. can also be used. In the case where the acrylate monomer is used, radical polymerization initiators generally used such as organic peroxides, tributyltin compounds, and azobis(isobutyronitril) are required. The combination of the polyfunctional acrylate and the organic peroxide is preferred.

The content of the above-mentioned hardener is preferably 15% by weight or less based on the total weight of Low Tg resin (A) and High Tg resin (B), considering the balance among the tackiness of a viscoelastic resin composition to be obtained, the vibration damping property, and tackiness of a vibration damping material obtained by using the resin composition, and the heat resistance of the vibration damping material.

For the purpose of increasing the adhesion of a viscoelastic resin composition to be obtained, a tackifier such as modified rosin, gum rosin, coumarone-idene resin, and xylene resin can be used. In particular, in order to obtain a resin composition excellent in heat resistance and adhesion, a tackifier which is liquid at a room temperature and has a functional group such as a hydroxy group, an epoxy group, and a carboxyl group is preferably used. Liquid epoxy resins, liquid rosin modified with a fatty acid, and liquid xylene resins having a hydroxyl group are more preferred.

Moreover, if required, various kinds of fillers, plasticizers, antioxidants, coupling agents, UV-ray absorbents, etc. can be contained in the viscoelastic resin composition of the present invention, as long as the performance of the viscoelastic resin composition is not deteriorated.

The viscoelastic resin composition of the present invention is obtained by mixing Low Tg resin (A), High Tg resin (B), and if required, various kinds of additives such as hardeners and tackifiers in accordance with ordinary methods.

When an attachable vibration damping material is prepared by using the viscoelastic resin composition, various methods as described below can be used depending on the purpose:

1) The above-mentioned resin composition is dissolved in a solvent, the mixture thus obtained is coated onto a substrate, and the solvent is removed by an ordinary process such as heating;

2) The above-mentioned resin composition is formed into a film, and the film thus obtained is laminated on a substrate; and 3) The above-mentioned resin composition is directly extruded onto a substrate, or the resin composition is directly coated onto the substrate by using a spatula, a trowel, or a roller.

For preparing a sandwich type vibration damping material by using the viscoelastic resin composition of the present invention, the following methods can be used:

1) The above-mentioned resin composition is coated onto a first substrate and dried, and a second substrate is placed thereon;

2) The above-mentioned resin composition is formed into a film, the film thus obtained is inserted between two substrates, and under this condition, the two substrates are attached to the film by pressure; and 3) Another type of the vibration damping material can be prepared by coating the above-mentioned resin composition onto both faces of a substrate.

A substrate used for preparing the attachable vibration damping material of the present invention has a Young's modulus of $3 \times 10^{10}$ dyne/cm$^2$ or more. Examples of the substrate include various kinds of metallic foils made of aluminum, stainless steel, lead, tin plate, galvanized sheet iron, or the like; films made of polymer compounds such as polyethylene terephthalate, polyvinyl chloride, and thermosetting resins; and the like. A metallic foil with high rigidity is preferred. In particular, a stainless foil is preferred. When the Young's modulus is less than $3 \times 10^{10}$ dyne/cm$^2$, a substrate is deformed together with a viscoelastic resin coated thereon when vibration is applied to the substrate, and thus the vibration damping property is unsatisfactory.

The thickness of the resin layer provided on the substrate of the attachable vibration damping material of the present invention is preferably in the range of 30 to 200 μm. When the thickness is less than 30 μm, there is a tendency that the adhesion, tackiness, and the like of the resin layer and the vibration damping property of a vibration damping material to be obtained become insufficient. When the thickness is more than 200 μm, there is a tendency that the heat resistance, durability, and the like of a vibration damping material to be obtained decrease.

The viscoelastic resin composition of the present invention contains Low Tg resin (A) (i.e., a polyester having predetermined components, a predetermined glass transition temperature, and a predetermined molecular weight) and High Tg resin (B) (i.e., an amorphous polyester resin or the like having a predetermined glass transition temperature) in a predetermined ratio. Because of this, attachable and sandwich type vibration damping materials prepared by using the resin composition of the present invention are excellent in a vibration damping property, heat resistance, and durability.

In addition, the heat resistance and durability of the vibration damping material can greatly be improved without decreasing the adhesion of the resin composition by mixing various kinds of hardeners with the resin composition. This is considered as follows: When the resin composition containing the hardeners are heated, a cross-linking reaction proceeds, and as a result, a three-dimensional cross-linked structure is formed among at least part of the polymers present in the resin composition.

EXAMPLES

Hereinafter, the present invention will be described by way of illustrating Examples. In Preparations and Examples, all "parts" are "parts by weight" unless otherwise stated.

Preparation of Polyester (a)

First, 58 parts of dimethyl terephthalate, 76 parts of dimethyl isophthalate, 1.9 parts of trimellitic acid anhydride, 87 parts of ethylene glycol, 96 parts of 2-butyl-2-ethyl-1,3-propanediol, and 0.1 parts of tetrabutyl titanate were placed in a reactor equipped with a thermometer, a stirrer, and a condenser. Transesterification was conducted at a temperature in the range of 180° C. to 230° C. for 8 hours. Then, 173 parts of dimer acid was added to the mixture and esterification was conducted at a temperature in the range of 180° C. to 230° C. for 4 hours. Then, the pressure of the reaction system was reduced to 5 mmHg over 30 minutes. During this period, the temperature rose to 250° C. Moreover, polycondensation reaction was conducted under the pressure of 0.3 mmHg at 250° C. for 1 hour. Thus, Polyester (a) was obtained. Polyester (a) had a number average molecular weight of 15000, a glass transition temperature of −20° C., and a specific gravity of 1.06 at 30° C.

Preparation of Polyester (b)

Polyester (b) was obtained in the same way as in Preparation of Polyester (a), except that the kind and content of components were changed as shown in Table 1.

Preparation of Polyesters (c) and (d)

Polycondensation reaction was conducted in the same way as in Preparation of Polyester (a), changing the kind and content of the components as shown in Table 1, nitrogen gas was introduced into the reaction system, ε-caprolactone was placed in the reactor, and the reaction mixture was stirred to make it homogeneous. Then, the reaction system was heated at a temperature in the range of 200° to 210° C. for 1 hour, whereby a ring-opening addition reaction was conducted. Thus, Polyesters (c) and (d) were obtained.

Preparation of Polyesters (e) to (g)

Polyesters (e) to (g) were obtained in the same way as in Preparation of Polyester (a), except that the kind and content of components were changed as shown in Table 1.

TABLE 1

|  | Polyester (a) | Polyester (b) | Polyester (c) | Polyester (d) | Polyester (e) | Polyester (f) | Polyester (g) |
|---|---|---|---|---|---|---|---|
| Components of resin |  |  |  |  |  |  |  |
| Acid components |  |  |  |  |  |  |  |
| Torephthalic acid | 30 | 29 | 39 | 29 | 50 | 45 | 50 |
| Isophthalic acid | 39 | 29 | 40 | 29 | 50 | 40 | 49 |
| Dimer acid | 30 | 40 | 20 | 40 |  |  |  |
| Sebacic acid |  |  |  |  |  | 15 |  |
| Trimellitic acid | 1 | 2 | 1 | 2 |  |  | 1 |
| Glycol components |  |  |  |  |  |  |  |
| Ethylene glycol | 60 |  | 40 |  | 50 | 55 | 40 |
| 1,6-Hexanediol |  |  |  |  |  |  | 60 |
| Neopentyl glycol |  | 50 |  | 50 | 50 | 45 |  |
| 2-Butyl-2-ethyl-1,3-Propanediol | 40 |  | 60 |  |  |  |  |
| 3-Methyl-1,5-pentanediol |  | 50 |  | 50 |  |  |  |
| Amount of ε-caprolactone | — | — | 100 | 100 | — | — | — |
| Number average molecular weight | 15000 | 20000 | 24000 | 28000 | 15000 | 12000 | 13000 |
| Glass transition temperature (°C.) | −20 | −32 | −25 | −44 | 65 | 45 | 25 |
| Specific gravity at 30° C. | 1.06 | 1.03 | 1.09 | 1.03 | 1.26 | 1.25 | 1.25 |

Preparation of Polyesters (h) and (i)

Polyesters (h) to (i) were obtained in the same way as in Preparation of Polyester (a), except that the kind and content of components were changed as shown in Table 2.

Preparation of Polyester (j)

Polycondensation reaction was conducted in the same way as in Preparation of Polyester (a), changing the kind and content of the components as shown in Table 2, nitrogen gas was introduced into the reaction system, ε-caprolactone was placed in the reactor, and the reaction mixture was stirred to make it homogeneous. Then, the reaction system was heated at a temperature in the range of 200° to 210° C. for 1 hour, whereby a ring-opening addition reaction was conducted. Thus, Polyester (j) was obtained.

Preparation of Polyesters (k) and (l)

Polyesters (k) and (l) were obtained in the same way as in Preparation of Polyester (a), except that the kind and content of components were changed as shown in Table 2.

ganox 1010, manufactured by Ciba Geigy Limited) were dissolved in a mixture of cyclohexanone and toluene (1:1, by volume) (1/1, v/v) at 80° C., and the solution was cooled to room temperature. This solution was coated onto a stainless steel foil with a thickness of 0.03 mm so as to have a thickness of 70 μm. The coated solution was dried by hot blast at 180° C. for 5 minutes and cooled to room temperature. The laminate thus obtained was allowed to stand at room temperature for 10 days and press-bonded to a cold-rolled steel plate with a thickness of 0.5 mm at 5 kg/cm, resulting in a sandwich-type vibration damping material. The components of the viscoelastic resin composition in the material thus obtained is shown in Table 3. The components of viscoelastic resin compositions used in Examples 2 to 7 are also shown in Table 3. Evaluation results of a vibration damping property and adhesion (initial peeling strength, peeling strength after heating, and peeling strength after a weatherability test, are shown in Table 5. Evaluation results of Examples 2 to 7 are also shown in Table 5. The evaluation was conducted by the following methods:

1. Vibration Damping Property

The vibration damping material was cut into a sample

TABLE 2

|  | Polyester (h) | Polyester (i) | Polyester (j) | Polyester (k) | Polyester (l) |
|---|---|---|---|---|---|
| Components of resin |  |  |  |  |  |
| Acid components |  |  |  |  |  |
| Torephthalic acid | 48 | 20 | 30 | 50 | 50 |
| Isophthalic acid | 20 | 18 | 28 | 20 | 50 |
| Dimer acid | 30 | 60 |  |  |  |
| Sebacic acid |  |  | 40 | 30 |  |
| Trimellitic acid | 2 | 2 | 2 |  |  |
| Glycol components |  |  |  |  |  |
| Ethylene glycol | 80 |  | 50 | 55 | 15 |
| 1,9-Nonanediol |  |  |  |  | 45 |
| Neopentyl glycol | 20 |  | 50 | 45 |  |
| 3-Methyl-1,5-pentanediol |  | 70 |  |  |  |
| Neopentyl glycol hydroxypivalate |  | 30 |  |  |  |
| 1,4-Cyclohexanedimethanol |  |  |  |  | 40 |
| Amount of ε-caprolactone | — | — | 150 | — | — |
| Number average molecular weight | 18000 | 14000 | 24000 | 20000 | 22000 |
| Glass transition temperature (°C.) | −15 | −42 | −35 | 7 | 15 |
| Specific gravity at 30° C. | 1.09 | 1.02 | 1.16 | 1.20 | 1.15 |

Example 1

First, 50 parts of Polyester (a), 50 parts of Polyester (g), and 0.2 parts of hindered phenol antioxidant (Irganox 1010, sheet (30 mm × 300 mm) and the damping factor (η) of the sample was measured with a vibration of 500 Hz at different temperatures in accordance with the mechanical impedance method. A sample having a larger η shows a more superior vibration damping property.

2. Peeling Strength (Initial Value)

The vibration damping material was cut into a size of 25 mm×100 mm, and measured for T peeling strength (90° peeling strength) in a longitudinal direction at a peeling rate of 50 mm/min. and at an ambient temperature of 20° C.

3. Peeling Strength After Heating

A sample (25 mm×100 mm) of the vibration damping material was heat-treated at 230° C. for 30 min., and then evaluated for peeling strength in the same way as in the above item 2.

4. Peeling Strength After Weatherability Test

A sample (25 mm×100 mm) of the vibration damping material was allowed to stand for 240 hours under the condition of 80° C. and RH 95%, and then evaluated for peeling strength in the same way as in the above item 2.

Examples 2 to 7

Various samples of vibration damping materials were prepared by using the polyester resins, hardeners, and additives shown in Table 3 in the same way as in Example 1. The samples thus obtained were evaluated in the same way as in Example 1.

In Example 2, as a hardener, Epo Tohto YD-8125 (an epoxy resin with a molecular weight of about 350 and a specific gravity of 1.17, manufactured by Tohto Kasei Co., Ltd.) and benzophenonetetracarboxylic dianhydride were used, and as a ring-opening catalyst for an epoxy group, triphenylphosphine was used.

In Example 3, as a hardener, Coronate EH (manufactured by Nippon Polyurethane Company) was used.

In Example 4, as a hardener, Epo Tohto YD-8125 and benzophenonetetracarboxylic dianhydride were used, and as a ring-opening catalyst for an epoxy group, triphenylphosphine was used.

In Example 5, as High Tg resin (B), Pheno Tohto YP-50 (a phenoxy resin with a specific gravity of 1.20, manufactured by Tohto Kasei Co., Ltd.) was used, and as a hardener, trimethylolpropane triacrylate was used in combination with benzoyl peroxide.

In Example 6, as a component of High Tg resin (B), an amorphous polyester resin and Epo Tohto YD-017 (an epoxy resin with a molecular weight of about 4000 and a specific gravity of 1.20, manufactured by Tohto Kasei Co., Ltd.) were used.

In Example 7, as High Tg resin (B) Epo Tohto YD-017 (an epoxy resin with a molecular weight of about 4000 and a specific gravity of 1.20) was used, and as a hardener, trimethylol propane triacrylate was used in combination with benzoyl peroxide.

Comparative Examples 1 to 8

Various samples of vibration damping materials were prepared by using the polyester resins, hardeners, and additives shown in Table 4 in the same way as in Example 1. The samples thus obtained were evaluated for a vibration damping property, peeling strength, peeling strength after heating, and peeling strength after weatherability test by the same method as that of Example 1. The results are shown in Table 6.

In Comparative Examples 1 and 2, the mixing ratio between High Tg resin (B) and Low Tg resin (A) was not within the scope of the present invention. In Comparative Example 3, the weight ratio between Low Tg resin (A) and High Tg resin (B) was not within the scope of the present invention. In Comparative Example 4, an epoxy resin with a number average molecular weight of less than 1000 was used as High Tg resin (B). In Comparative Example 5, the amount of glycol with an alkyl group as its side chain was smaller than that used in the present invention. In Comparative Example 6, the used amount of dimer acid was not within the scope of the present invention. In Comparative Example 7, a fatty acid other than dimer acid was used.

TABLE 3

| | Example 1 | Example 2 | Example 3 | Example 4 | Example 5 | Example 6 | Example 7 |
|---|---|---|---|---|---|---|---|
| Components of viscoelastic resin compositon (parts by weight) | | | | | | | |
| Polyester (a) | 50 | 70 | | | | | |
| Polyester (b) | | | 40 | | | 50 | 40 |
| Polyester (c) | | | | 60 | | | |
| Polyester (d) | | | | | 50 | | |
| Polyester (e) | | | | 40 | | | |
| Polyester (f) | | | 60 | | | | |
| Polyester (g) | 50 | 30 | | | | 25 | |
| Pheno Tohto [YP-50] | | | | | 50 | | |
| Epo Tohto [YD-8125] | | 5 | | 5 | | 5 | |
| Epo Tohto [YD-017] | | | | | | 25 | 60 |
| Benzophenone-tetracarboxylic dianhydride | | 1 | | 1 | | 1 | |
| Triphenyl-phosphine | | 0.6 | | 0.6 | | 0.6 | |
| Coronate EH | | | 5 | | | | |
| Trimethylol propane triacrylate | | | | | | 10 | 10 |
| Benzoyl peroxide | | | | | 1 | | 1 |
| Irganox 1010 | 0.2 | 0.2 | 0.2 | 0.2 | 0.2 | 0.2 | 0.2 |

TABLE 4

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Components of viscoelastic resin composition (parts by weight) | | | | | | | | |
| Polyester (c) | 10 | 25 | 95 | 50 | 60 | | | |
| Polyester (e) | 90 | 75 | 5 | | | | | |
| Polyester (h) | | | | | | 50 | | |
| Polyester (i) | | | | | | | 50 | |
| Polyester (j) | | | | | | | | 50 |
| Polyester (k) | | | | | | 50 | | |
| Polyester (l) | | | | 50 | | | | 50 |
| Pheno Tohto [YP-50] | | | | | | | 50 | |
| Epo Tohto [YD-8125] | 5 | 5 | 5 | | 40 | | | 5 |
| Epo Tohto [YD-017] | | | | | | | | 50 |
| Benzophenone-tetracarboxylic dianhydride | 1 | 1 | 1 | | 2 | | | 1 |
| Triphenyl-phosphine | 0.6 | 0.6 | 0.6 | | 0.6 | | | 0.6 |
| Coronate EH | | | | 5 | | | | |
| Trimethylol propane triacrylate | | | | | | 10 | 10 | |
| Benzoyl peroxide | | | | | | 1 | 1 | |
| Irganox 1010 | 0.2 | 0.2 | 0.2 | 0.2 | 0.2 | 0.2 | 0.2 | 0.2 |

TABLE 5

| | Example 1 | Example 2 | Example 3 | Example 4 | Example 5 | Example 6 | Example 7 |
|---|---|---|---|---|---|---|---|
| Vibration damping property | | | | | | | |
| 20° C. | 0.06 | 0.18 | 0.06 | 0.12 | 0.08 | 0.07 | 0.07 |
| 40° C. | 0.11 | 0.18 | 0.09 | 0.14 | 0.09 | 0.10 | 0.09 |
| 60° C. | 0.22 | 0.21 | 0.14 | 0.16 | 0.06 | 0.12 | 0.11 |
| 80° C. | 0.14 | 0.13 | 0.25 | 0.24 | 0.12 | 0.15 | 0.15 |
| 100° C. | 0.08 | 0.11 | 0.18 | 0.28 | 0.18 | 0.19 | 0.13 |
| 120° C. | 0.06 | 0.10 | 0.15 | 0.18 | 0.21 | 0.13 | 0.13 |
| Adhesion (Peeling strength) | | | | | | | |
| Initial | 1.6 kg/25 mm | 1.8 | 2.1 | 1.8 | 1.7 | 2.4 | 1.7 |
| After heating | 3.2 kg/25 mm | 4.2 | 5.2 | 4.7 | 4.6 | 4.6 | 4.1 |
| After weatherability test | 1.8 kg/25 mm | 3.8 | 4.8 | 4.5 | 4.3 | 4.5 | 3.8 |

TABLE 6

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Vibration damping property | | | | | | | | |
| 20° C. | Impossible to measure | 0.03 | 0.25 | 0.21 | 0.08 | 0.13 | 0.02 | 0.03 |
| 40° C. | Impossible to measure | 0.05 | 0.21 | 0.18 | 0.07 | 0.21 | 0.02 | 0.06 |
| 60° C. | Impossible to measure | 0.07 | 0.17 | 0.10 | 0.04 | 0.12 | 0.04 | 0.13 |
| 80° C. | Impossible to measure | 0.13 | 0.04 | 0.06 | 0.02 | 0.05 | 0.14 | 0.14 |
| 100° C. | Impossible to measure | 0.21 | 0.02 | 0.03 | lower than 0.01 | 0.04 | 0.17 | 0.09 |
| 120° C. | Impossible to measure | 0.19 | lower than 0.01 | 0.01 | lower than 0.01 | 0.02 | 0.15 | 0.04 |
| Adhesion (Peeling strength) | | | | | | | | |
| Initial | 0 kg/25 mm | 0.5 | 0.6 | 0.3 | 1.4 | 0.8 | 2.3 | 0.9 |
| After heating | 0 kg/25 mm | 0.9 | 0.9 | 1.2 | 2.3 | 2.4 | 1.9 | 2.4 |
| After weatherability test | 0 kg/25 mm | 0.7 | 0.7 | 0.6 | 1.2 | 1.8 | 0.3 | 0.8 |

As is apparent from Examples and Comparative Examples, a vibration damping material obtained by selecting a particular amorphous polyester resin is excellent in a vibration damping property in a wide range of temperatures. In particular, the adhesion of the resin composition of the present invention and the vibration damping property of the vibration damping material prepared by using the resin composition are excellent at high temperatures. Moreover, when various kinds of hardeners are mixed with the selected resin to obtain a resin composition, the heat resistance and durability of a vibration damping material obtained by using this resin composition can greatly be improved without decreasing the adhesion of the resin composition thus obtained. When the viscoelastic resin composition containing a hardener is put under a high temperature for a short period of time, a cross-linking reaction proceeds. The resin composition keeps adhesion even after the completion of the cross-liking reaction, and the degree of adhesion does not change with time. The vibration damping material prepared by using this resin composition has satisfactory heat resistance and durability.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A viscoelastic resin composition for a vibration damping material, comprising:

a low Tg resin (A) with a glass transition temperature of $-60°$ C. to $0°$ C. and a number average molecular weight of 5000 to 50000, the low Tg resin (A) being a polyester containing an acid component having 50 to 90 mol % of aromatic dicarboxylic acid and 10 to 50 mol % of dimer acid, and a glycol component having at least 30 mol % of glycol with an alkyl group as its side chain and the glycol having at least four carbon atoms; and high Tg resin (B) which is at least one selected from the group consisting of amorphous polyester resins, phenoxy resins, and epoxy resins, the epoxy resins having a number average molecular weight of at least 1000, the respective resins having a glass transition temperature in the range of $0°$ C. to $80°$ C., wherein the weight ratio between the low Tg resin (A) and the high Tg resin (B) is in the range of 90:10 to 30:70, and wherein the difference in specific gravity at $30°$ C. between the low Tg resin (A) and the high Tg resin (B) is in the range of 0.17 to 0.25.

2. A viscoelastic resin composition for a vibration damping material according to claim 1, wherein the difference in specific gravity at $30°$ C. between the low Tg resin (A) and the high Tg resin (B) is in the range of 0.17 to 0.2.

3. A viscoelastic resin composition for a vibration damping material according to claim 1, further comprising at least one hardener selected from the group consisting of epoxy resins, polyisocyanate compounds, acid anhydride compounds, and acrylate monomers.

4. A viscoelastic resin composition for a vibration damping material according to claim 1, further comprising at least one tackifier selected from the group consisting of modified rosins, coumarone-indene resins, and xylene resins.

5. A vibration damping material comprising a substrate and a layer made of a viscoelastic resin composition of claim 1 formed on the substrate, said substrate having a Young's modulus of $3 \times 10^{10}$ dyne/cm$^2$ at $20°$ C.

* * * * *

UNITED STATES PATENT AND TRADEMARK OFFICE
CERTIFICATE OF CORRECTION

PATENT NO. : 5,411,810
DATED : May 2, 1995
INVENTOR(S) : Hiroshi Hirakouchi, et al.

It is certified that error appears in the above-indentified patent and that said Letters Patent is hereby corrected as shown below:

Column 1, line 27, "end" should read -- and --;

Column 8, line 56, "coumarone-idene" should read -- coumarone-indene --; and

Column 11, Table 1 and Table 2, first column line 3, "Torephthalic acid" should read -- Terephthalic acid --.

Column 18, line 3, before "high" insert -- a --.

Signed and Sealed this

Thirtieth Day of January, 1996

Attest:

BRUCE LEHMAN

*Attesting Officer*          *Commissioner of Patents and Trademarks*